H. PHELPS.
Running-Gear.
No. 15,191.
Patented June 24, 1856
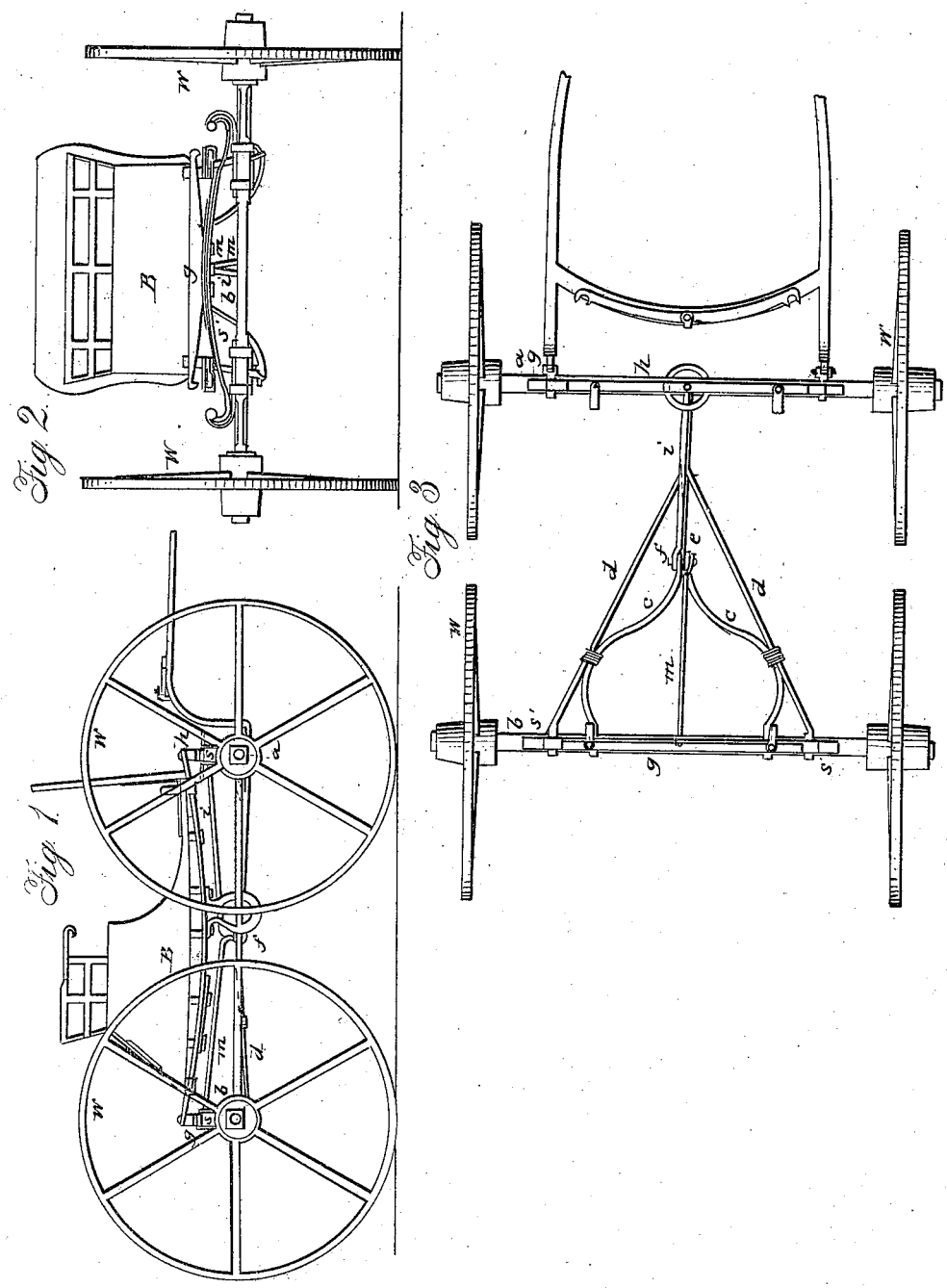

UNITED STATES PATENT OFFICE.

HENRY PHELPS, OF WHITE HALL, NORTH CAROLINA.

RUNNING-GEAR OF VEHICLES.

Specification of Letters Patent No. 15,191, dated June 24, 1856.

To all whom it may concern:

Be it known that I, HENRY PHELPS, of White Hall, in the county of Wayne and State of North Carolina, have invented a new and useful Improvement in Carriage Running-Gear; and I do hereby declare that the following is a full, clear, and exact description of the construction and operation of the same, reference being had to the annexed drawing, forming part of this specification, in which—

Figure 1 is a side elevation of a vehicle with my improved running gear. Fig. 2 is a rear elevation of same. Fig. 3 is a top view of running gear—body of vehicle being removed.

Similar letters of reference in the several figures denote the same part.

My invention refers to a simple method of giving light vehicles ease of motion, in a longitudinal direction.

It consists in combining with a perch composed of elastic rods united midway between the axles by a joint, two elastic rods running from this joint, the one to the front and the other to the rear cross bar supporting the body; the details of construction and operation being as follows:

In the drawing B is the body, W the wheels, $a$ the front and $b$ the rear axle. The axles are connected by a perch composed of rods $c\ c$, $d\ d$, and $e$, the former united with the latter by a joint $f$, and $d\ d$ uniting and running to the fore axle as shown in Fig. 3. This joint is connected with the head block $h$ by the elastic bar $i$; and with piece $g$ by the rod $m$, as shown in Fig. 2. All of these rods are elastic, and the system united as above described acts as follows to relieve the springs $s\ s'$. Pressure on either spring is carried by the rod leading to joint $f$, directly to the perch, which owing to its elasticity receives it without shock.

By this construction the vehicle is made to rest upon a spring running longitudinally, which besides easing the motion of the vehicle, prevents injury to the front and rear springs from sudden jolts in crossing hollows and on other occasions.

I disclaim spring coupling for vehicles, broadly considered, as various devices have been employed for that purpose, but

I claim as new and desire to secure by Letters Patent—

The combination of the elastic rods $i$ and $m$, with the rods $c\ c$, $d\ d$, and $e$, jointed at $f$ as described, and operating as, and for the purposes set forth.

In testimony whereof, I have hereunto signed my name before two subscribing witnesses.

HENRY PHELPS.

Witnesses:
JOHN S. HOLLINGSHEAD,
GEO. PATTEN.